(12) United States Patent  
Schilder et al.

(10) Patent No.: US 12,247,649 B2  
(45) Date of Patent: Mar. 11, 2025

(54) ELECTRIC DRIVE DEVICE FOR A VEHICLE AXLE

(71) Applicant: MERCEDES-BENZ GROUP AG, Stuttgart (DE)

(72) Inventors: Tobias Schilder, Ludwigsburg (DE); Philip Gansloser, Bad Ditzenbach (DE); Tobias Haerter, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/294,252

(22) PCT Filed: Jul. 26, 2022

(86) PCT No.: PCT/EP2022/070892  
§ 371 (c)(1),  
(2) Date: Feb. 1, 2024

(87) PCT Pub. No.: WO2023/011978  
PCT Pub. Date: Feb. 9, 2023

(65) Prior Publication Data  
US 2024/0344599 A1  Oct. 17, 2024

(30) Foreign Application Priority Data  
Aug. 2, 2021 (DE) ................... 10 2021 003 969.6

(51) Int. Cl.  
*B60K 1/02* (2006.01)  
*B60K 17/08* (2006.01)  
(Continued)

(52) U.S. Cl.  
CPC ........... *F16H 37/0806* (2013.01); *B60K 1/02* (2013.01); *B60K 17/08* (2013.01); *B60K 17/165* (2013.01);  
(Continued)

(58) Field of Classification Search  
CPC ..... B60K 1/02; F16H 3/10; F16H 2200/0021; F16H 2003/0931  
See application file for complete search history.

(56) References Cited

U.S. PATENT DOCUMENTS 6,768,932 B2    7/2004   Claypole et al.  
9,067,484 B2 *  6/2015   Zhao ................... B60K 1/00  
(Continued)

FOREIGN PATENT DOCUMENTS

CN          1602419 A        3/2005  
DE   102018203456 A1 *     9/2019  
(Continued)

OTHER PUBLICATIONS

International Search Report and Written Opinion mailed Nov. 7, 2022 in related/corresponding International Application No. PCT/EP2022/070892.

(Continued)

*Primary Examiner* — Sherry L Estremsky  
(74) *Attorney, Agent, or Firm* — PATENT PORTFOLIO BUILDERS PLLC

(57) ABSTRACT

An electric drive device for a vehicle axle includes first and second electric engines having first and second rotors, respectively. A transmission has a first and second input shafts arranged coaxially with the first and second rotors, respectively, and an output shaft arranged in parallel with the first and second input shafts. An axle drive has a differential gear permanently meshing with at least one drive gearwheel connected to the at least one output shaft in a manner fixed against rotation. A first switchable spur gear pairing and a second spur gear pairing respectively couple the first and second input shafts with the differential gear in a torque-transmitting manner. When viewed in an axial direction along the at least one output shaft, the first electric engine, the first spur gear pairing, the at least one drive gearwheel, (Continued)

Figure 1:
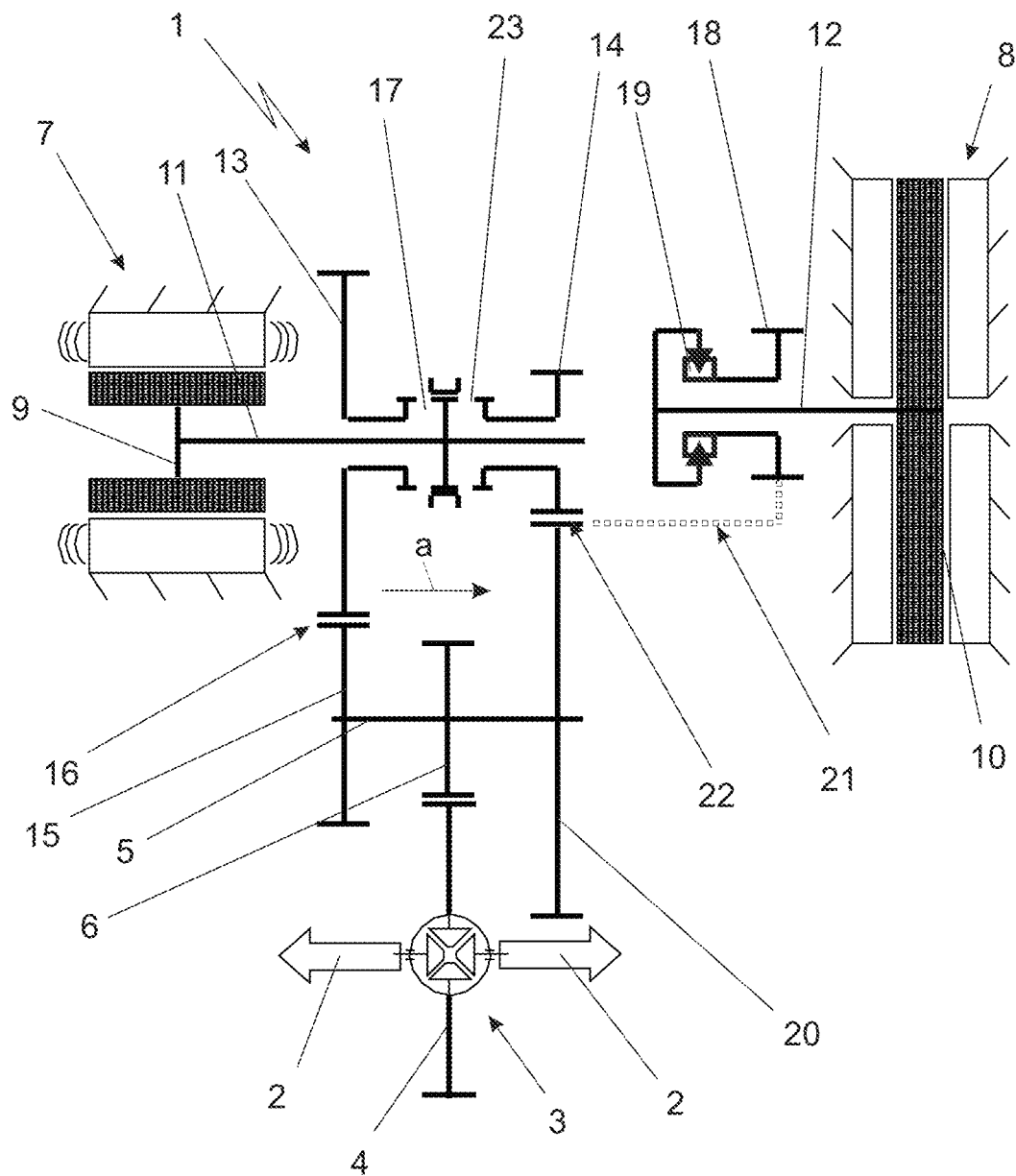

the second spur gear pairing, and the second electric engine are arranged one after the other in the specified order.

7 Claims, 2 Drawing Sheets

(51) Int. Cl.
    *B60K 17/16*         (2006.01)
    *F16H 37/08*         (2006.01)
    *F16H 3/10*         (2006.01)

(52) U.S. Cl.
    CPC ........ *F16H 3/10* (2013.01); *F16H 2200/0021* (2013.01); *F16H 2200/0039* (2013.01)

(56) References Cited

U.S. PATENT DOCUMENTS

| | | | |
|---|---|---|---|
| 9,579,966 B2 | 2/2017 | Luehrs et al. | |
| 9,789,754 B2 * | 10/2017 | Zhu | B60W 20/00 |
| 10,576,816 B2 * | 3/2020 | Eo | B60K 6/383 |
| 11,133,763 B1 * | 9/2021 | Islam | B60K 1/02 |
| 11,850,928 B2 | 12/2023 | Seemann et al. | |
| 2009/0023529 A1 * | 1/2009 | Sanji | B60K 25/02 475/5 |
| 2019/0152311 A1 | 5/2019 | Eo et al. | |
| 2021/0316608 A1 | 10/2021 | Marechal et al. | |

FOREIGN PATENT DOCUMENTS

| | | | |
|---|---|---|---|
| DE | 102018210897 A1 | 1/2020 | |
| DE | 102020004777 A1 | 10/2020 | |
| DE | 102019132224 A1 | 6/2021 | |
| EP | 3020588 A2 | 5/2016 | |
| GB | 2454592 A * | 5/2009 | ............ B60K 6/387 |
| WO | 03050498 A1 | 6/2003 | |
| WO | 2014032961 A1 | 3/2014 | |
| WO | 2020025775 A1 | 2/2020 | |
| WO | 2020058103 A1 | 3/2020 | |

OTHER PUBLICATIONS

Office Action created Oct. 25, 2022 in related/corresponding DE Application No. 10 2021 003 969.6.

* cited by examiner

ELECTRIC DRIVE DEVICE FOR A VEHICLE AXLE

BACKGROUND AND SUMMARY OF THE INVENTION

Exemplary embodiments of the invention relate to an electric drive device for a vehicle axle.

Electric drive devices for a vehicle axle are known from the prior art. Thus, for example, DE 10 2018 210 897 A1 shows an arrangement for driving an electric vehicle. The structure disclosed therein comprises two different electric engines, specifically a permanent synchronized engine on the one hand and an asynchronous engine on the other. These engines are operated at different speeds. Both of the electric engines are connected to a differential for driving a driven axle of the electric vehicle via a transmission. The rotor in each of the two electric engines is or can be coupled with an input shaft of the transmission. Via an output shaft, which could also be referred to as a counter shaft, a drive gearwheel is then driven, which drive gearwheel meshes with a gearwheel of the differential and can thus drive the electrically driven axle.

Exemplary embodiments of the present invention are directed to further improve such an electric drive device with regard to flexibility and efficacy.

The electric drive device according to the invention serves to drive a vehicle axle, and comprises, similar to the electric drive device in the prior art specified in the introduction, a first and a second electric engine, a transmission and an axle drive having a differential gear, which permanently meshes with a drive gearwheel or, in the case of several output shafts, with several drive gearwheels.

In the electric drive device for a vehicle axle according to the invention, two spur gear pairings are further arranged, specifically a first spur gear pairing and a second spur gear pairing, wherein a spur gear pairing should be understood to mean two gearwheels that permanently mesh with each other, wherein in the case of the present invention, one of the gearwheels is arranged coaxially with one of the two input shafts, and the other gearwheel of the spur gear pairing is arranged coaxially with one of the output shafts. At least one of the two spur gear pairings can be switched, wherein a switchable spur gear pairing should be understood to mean that one of the two gearwheels of the spur gear pairing is connected to the shaft with which it is coaxially arranged in a manner fixed against rotation, the other gearwheel can be connected to the shaft with which it is coaxially arranged in a manner fixed against rotation by means of a coupling. Thus, if the spur gear pairing is designed as a switchable spur gear pairing, it has a fixed gear and an idler gear. In principle, two idler gears, both of which can be connected to their shaft so as to switch via a coupling in a manner fixed against rotation, would also be conceivable for a switchable spur gear pairing.

By a connection fixed against rotation of two rotatably mounted elements is meant, in the context of the present invention, that the two elements are arranged coaxially with each other, and are connected to each other such that they rotate at the same angular speed.

According to the invention, in the electric drive device described here, it is the case that with regard to an axial direction, when viewed along an axis of rotation of the at least one first output shaft, the first electric engine, the first spur gear pairing, the drive gearwheel, the second spur gear pairing and the second electric engine are arranged one after the other in the specified order. The two electric engines thus enclose the transmission between them, and are arranged spaced apart from each other in the axial direction, wherein the first spur gear pairing, the second spur gear pairing, and between them the drive gearwheel, are located between the electric engines. The structure of the electric drive device according to the invention can be constructed correspondingly compactly in the radial direction. Different gear ratios can be switched, such that several gears, and thus several rotational speeds, can be implemented via the structure of the electric drive device according to the invention.

By the axial direction, the direction of the axis of rotation of the first output shaft is meant.

One very advantageous development of the electric drive device according to the invention further provides that the axle drive is arranged between the first electric engine and the second electric engine with regard to the axial direction. A very compact structure is thus created, which is in particular also ideally suited for use in electric passenger cars.

According to a very advantageous embodiment of the electric drive device, it can further be provided that the second electric engine has a length that is at least 25 percent shorter in comparison with the first electric engine. In comparison with the first electric engine, the second electric engine particularly advantageously has a diameter which is increased by at least 30 percent. As a result, on the one hand, the structure can thus be ideally adjusted to typical installation spaces, and on the other hand, the functions can be distributed across the two electric engines such that the first electric engine is designed as a base load engine, with correspondingly low power and for optimal use in the low-load region, which accounts for a majority of the operating time when used in a motor vehicle. The second electric engine, which is correspondingly implemented such that it is shorter in the axial direction, can be designed as a boost engine, wherein efficiency is here of secondary importance. The structure of the second electric engine can particularly advantageously be implemented as an axial flux engine.

According to a further, very advantageous embodiment of the electric drive device, the first rotor is connected to the first input shaft in a manner fixed against rotation, and the second rotor is coupled with the second input shaft in a manner fixed against rotation by means of a coupling element to interrupt the power flow in at least one direction of rotation. The first electric engine is thus directly connected to the first input shaft in a manner fixed against rotation. The second electric engine is connected by means of a coupling element. This coupling element only needs to be able to interrupt the power flow in at least one direction of rotation. This coupling element can thus be implemented as a freewheel in a particularly advantageous manner. Such a freewheel offers the possibility of no actuation needing to take place, such that it is possible to dispense with actuators, control lines, and the like, which is a very decisive advantage with regard to the required installation space. It is naturally still conceivable to also implement this coupling element as a separable coupling, in particular as a claw coupling.

A further very favorable embodiment of the electric drive device according to the invention further provides a third spur gear pairing, which is designed to couple the first input shaft with the differential gear in a torque-transmitting manner, because the first electric engine can be coupled in a torque-transmitting manner with the differential gear via exactly two spur gear pairings, specifically the first and the third spur gear pairing, and the second electric engine is coupled in a torque-transmitting manner with the differential gear via exactly one spur gear pairing, specifically the second spur gear pairing. This structure increases the possibility of varying the number of gears with regard to an operation with the first electric engine, as, in particular, both the first spur gear pairing and the third spur gear pairing can be designed to be switchable, such that either via one or the other spur gear pairing, the first electric engine drives on the at least one output shaft of the transmission via its input shaft, and thus makes it possible to drive the drive gearwheel arranged on the output shaft of the transmission at several rotational speeds. In addition, or as an alternative, to the first electric engine, the second electric engine can drive the output shaft and thus the differential as required in a torque-transmitting manner via the second spur gear pairing.

The differential gear is, in particular, an input gearwheel of the axle drive. The input gearwheel is that gearwheel via which torques which originate from the first electric engine or the second electric engine are introduced into the axle drive. The differential gear is advantageously connected to a differential cage of the associated axle drive in a manner fixed against rotation, wherein the axle drive is advantageously designed as a bevel gear differential.

In an advantageous development, the electric drive device according to this embodiment can provide a first and a second output shaft. The structure can thus be implemented with two output shafts, which can also be referred to as counter shafts. The rotor of the first electric engine then drives a first gearwheel via the first input shaft, the first gearwheel being arranged coaxially with the first input shaft. The first gearwheel meshes with a second gearwheel arranged coaxially with the first output shaft, such that, in combination, they form the first spur gear pairing. The second spur gear pairing provides a third gearwheel arranged coaxially with the second input shaft, and a fourth gearwheel arranged coaxially with the first output shaft. The third spur gear pairing is designed such that, starting from the first gearwheel arranged coaxially with the first input shaft, it acts on a fifth gearwheel arranged coaxially with the second output shaft, such that the second output shaft can be driven via the third spur gear pairing.

According to a very advantageous development of the latter, it can additionally be provided that the first drive gearwheel, the second drive gearwheel, and the coupling element, which serves to transmit torques from the second electric engine into the transmission, are all arranged at least partially axially overlapping one another. They thus lie such that they intersect with at least one plane lying perpendicular to the axial direction. The two drive gearwheels preferably lie in a shared gear plane, such that their gearings are arranged axially in the same region, wherein at least one coupling half of the coupling element is also arranged at least partially axially overlapping the gearings.

The fact that two elements are arranged axially overlapping each other means that the elements are respectively arranged at least partially with the same coordinates in relation to a spatial axis which is arranged in parallel with the axial direction.

A very favorable development of this idea further provides that the first spur gear pairing provides a first switch element lying coaxially with the first output shaft, and that the third spur gear pairing has a third switch element arranged coaxially with the second output shaft, wherein the first and the third switch element are arranged axially overlapping, preferably lie in the same gear plane again. The first electric engine, the first spur gear pairing, the first switch element, the coupling element, the second spur gear pairing and the second electric engine lie one after the other in the specified order in relation to the axial direction.

As already mentioned, the coupling element can be designed as a freewheel, however it can also be implemented as a classic separable coupling, in particular as a claw coupling. A potential synchronization can be implemented at least via one of the electric engines, such that, despite a claw coupling, the structure becomes capable of being power-shifted.

This also applies to the switch elements which are used. According to a particularly favorable embodiment of the electric drive device according to the invention, all switch elements can be designed as form-fit switch elements. No friction switch element, and no combination of a friction switch element and a form-fit switch element is thus necessary. Rather, a power-shiftable drive system can also be implemented with simple and low-loss claw switch elements via the possibility of a synchronization, in particular via the second electric engine Further advantageous embodiments of the electric drive device according to the invention for a vehicle axle also result from the exemplary embodiments, which are depicted in more detail in the following with reference to the figures.

BRIEF DESCRIPTION OF THE DRAWING FIGURES

Figure 2:
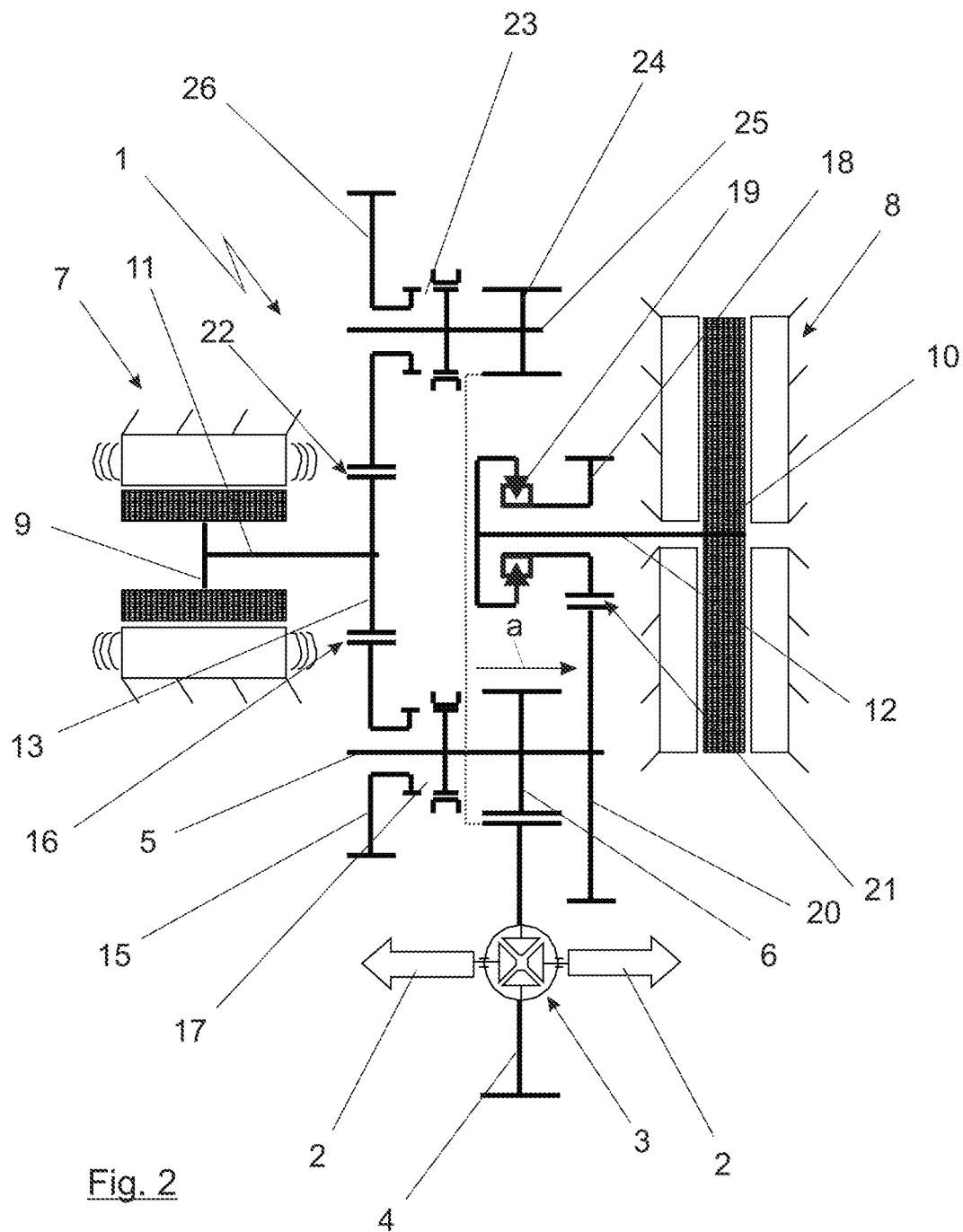

Here:

FIG. 1 shows a schematic depiction of a first possible embodiment of the electric drive device according to the invention for a vehicle axle; and FIG. 2 shows a schematic depiction of a second possible embodiment of the electric drive device according to the invention for a vehicle axle.

DETAILED DESCRIPTION

In the depiction of FIG. 1, an electric drive device labelled 1 in its entirety for a vehicle axle (not depicted) can be seen. The drive of the vehicle axle is implemented, as indicated by the two arrows 2, via an axle drive 3, which comprises at least one differential gear labelled 4. This differential gear 4 meshes with a drive gearwheel 6 connected to an output shaft 5 in a manner fixed against rotation. The differential gear 4 is connected in a manner fixed against rotation to a differential cage (not described in more detail) of the axle drive 3. The drive is optionally implemented via a first electric engine 7 and/or a second electric engine 8. The two electric engines 7, 8 respectively have a rotor 9, 10. The first rotor 9 of the first electric engine 7 is connected to a first input shaft 11 in a manner fixed against rotation. The second rotor 10 of the second electric engine 8 is connected to a second input shaft 12 in a manner fixed against rotation. Both input shafts 11, 12 lie in parallel with the output shaft 5 and an axial direction a defined, for example, by this output shaft 5.

Two idler gears are located on the first input shaft 11, wherein one idler gear as a first gearwheel 13 forms a first spur gear pairing 16 with a fixed gear designed as a second gearwheel 15 on the output shaft 5. This first spur gear pairing 16 can be switched via a first switch element 17 such that the first gearwheel 13 is either connected to the first input shaft 11 in a manner fixed against rotation or revolves on the latter freely, and thus without torque transmission.

The second input shaft 12 has a third gearwheel 18 arranged coaxially with this second input shaft 12, the third gearwheel being designed as an idler gear and able to be coupled with the second input shaft 12 via a coupling element 19 which can prevent the transmission of power in at least one direction of rotation. This coupling element 19 can, in particular, be designed as a freewheel, as is depicted here. As an alternative, a design as a classic coupling or switch device would also be conceivable, in particular as a claw switch device.

The third gearwheel 18 designed as an idler gear, which is arranged coaxially with the second input shaft 12, now meshes, as indicated by the dotted line, with a fourth gearwheel 20, which is arranged on the output shaft 5 in a manner fixed against rotation and coaxially. The third gearwheel 18 and the fourth gearwheel 20 thus form a second spur gear pairing labelled 21. As indicated by the dotted line, the structure lies in a different plane from the plane depicted here, such that the possibility additionally arises of including the fourth gearwheel 20 in a third spur gear pairing 22. In addition to the fourth gearwheel 20 designed as a fixed gear on the input shaft 5, this third spur gear pairing 22 comprises the further idler gear already mentioned above as a gearwheel 14, which can be coupled with the first input shaft 11 in a manner fixed against rotation and in a torque-transmitting manner via a second switch element 23, or revolves on the first input shaft 11 as an idler gear without torque transmission when the switch element 23 is opened. The second spur gear pairing 21 and the third spur gear pairing 22 thus lie in a shared gear plane. The second spur gear pairing 21 and the third spur gear pairing 22 are arranged axially overlapping each other.

The structure is such that, when viewed in the axial direction, the first spur gear pairing 16 follows the first electric engine 7. The differential gear 4 is then located on the output shaft 5 with the drive gear 6, and the two switch elements 17, 23, which are preferably designed as a double switch element, preferably lie overlapping this in an axial direction a or with their central plane in a shared gear plane with the drive gear 6 and the differential gear 4. The third spur gear pairing 22 then follows in the axial direction a, and lies in a gear plane together with the second spur gear pairing 21, as indicated here by the dotted line. The coupling element 19 can thus also move into an axial region of the two switch elements 17, 23, such that a relatively compact structure is also possible in the axial direction despite the electric engines 7, 8 arranged on both ends of the axial direction. By the axial region of the two switch elements 17, 23, an axial extension region of switch halves of the switch elements 17, 23 is meant. An actuator associated with the switch elements 17, 23 is not taken into account for the axial extension region. The preferred arrangement of the coupling element 19 in the axial region of the two switch elements 17, 23 specified here means that at least one coupling half of the coupling element 19 is arranged at least partially axially overlapping the axial extension region of the switch halves of the switch elements 17, 23.

Naturally, it would also be conceivable for the coupling element 19 to provide an own gear plane, and in this embodiment, the latter could then also be arranged between the electric engine 8 and the third gearwheel 18 of the second spur gear pairing 21. Both installation variants would also be possible for use of a coupling element 19 in the form of a claw switch element, and thus in one case a coupling element lying axially between the third gearwheel 18 and the second electric engine 8 and in another case a coupling element which can be shifted in the gear plane of the switch elements 17, 23 or of the drive gear 6 and of the differential gear 4.

The first electric engine 7 is designed as a base load engine. It can thus, in particular, be used for low loads and partial loads, and can be optimally designed with regard to its efficacy as a primarily used electric engine, because vehicles typically travel a lot in the base load and partial load range. The second electric engine 8 can correspondingly be designed to be considerably narrower in the axial direction a, and thus with a greater diameter. It then serves purely as a boost engine, and can, in particular, be implemented as an axial flux engine. Efficiency is of secondary importance in this case, because this boost engine is used only for a comparatively short time in comparison with the first electric engine 7.

The particular advantage of the structure is that different gears ratios can be implemented here, and power shifting is simultaneously possible without the need for the use of complex and relatively ineffective power-shifting elements, in particular power-shifting elements working with a friction fit, for this purpose. Instead, switch elements acting via form-fit, e.g., claw switch elements, can be used as the switch elements 17, 23.

In a first gear ratio, the first electric engine 7 would then primarily be active, and would, for example, provide the output shaft 5, and thus finally the differential gear 4 with torque via the third spur gear pairing 12 with its input shaft 11. The second electric engine 8 can be switched on as required. In particular, it can be switched on if it is necessary to adjust the rotational speeds in a switching process. This can be implemented such that a second gear stage is implemented exclusively via the second electric engine 8 by opening the previously closed switch element 23 and the first switch element 17 continuing to remain open. This first switch element 17 can then be closed, such that output drive is implemented in the third gear stage in turn with torque from the first electric engine 7. Power can also be fed in, as required, via the second electric engine 8 as a boost engine, or the latter can be used to adjust rotational speeds in order to make the electric drive device 1 capable of power shifting.

In the depiction of FIG. 2, an alternative embodiment variant can be seen. This embodiment variant of the electric drive device 1 is now comparable to the previous structure with regard to the axle drive 3 and the differential gear 4. The difference is that the differential gear 4 meshes on one side with the first drive gearwheel 6, which is now arranged on the shaft referred to below as first output shaft 5 coaxially and in a manner fixed against rotation. The differential gear 4 now additionally meshes, however, with a second drive gearwheel 24, which is arranged on a second output shaft 25. The two output shafts 5, 25 can also be referred to as counter shafts.

The second electric engine 8 with the third gearwheel 18, which forms the second spur gear pairing 21 with the fourth gearwheel 20, is constructed and arranged in a comparatively similar manner to that described in FIG. 1, wherein here too, the coupling element 19 is preferably, but not necessarily, designed as a freewheel, wherein the freewheel is here arranged on the side of the second electric engine 8 facing away from the third gearwheel 18 when viewed in the axial direction a.

The first electric engine is in turn designed with regard to its rotor 9 such that it is fixed against rotation with the first input shaft 11 of the transmission. The first gearwheel 13 is now arranged on this first input shaft 11 as a fixed gear, however. It meshes on one side with the second gearwheel 15, which is now arranged as an idler gear coaxially with the first output shaft 5 via the first switch element 17. The gearwheels 13, 15 thus form the first spur gear pairing 16 again, but, however, are designed in reverse with regard to the design as a fixed gear and idler gear.

The first gearwheel 13 now additionally meshes with a fifth gearwheel 26, which like the second gearwheel 15, is designed as an idler gear, but coaxially with the second output shaft 25. The switch element 23 can couple this idler gear as a fifth gearwheel 26 with the second output shaft 25 as required in a manner fixed against rotation, such that the second drive gearwheel 24 is correspondingly driven. The first drive gearwheel 6 on the first output shaft 5 and the second drive gearwheel 24 on the second output shaft 25 both now mesh with the differential gear 4, as indicated here again by the dashed line.

The structure is implemented such that the two spur gear pairings 16 and 22, and thus the first spur gear pairing 16 and the third spur gear pairing 22, lie in a gear plane. In the axial direction a alongside it on the side of the gear plane facing away from the first electric engine 7 with these two spur gear pairings 16 and 22, the two switch elements 17, 23 then lie in a gear plane followed by a gear plane with the differential gear 4 and the two drive gearwheels 6, 24, in which the coupling element 19 can also particularly preferably, but like the explanation for FIG. 1 not necessarily, be arranged.

In the embodiment of FIG. 2, the first drive gearwheel 6, the second drive gearwheel 24, the coupling element 19, and the differential gear 4 are all arranged overlapping axially, i.e., when viewed in the axial direction a.

A gear plane with the second spur gear pairing 21 then follows in the axial direction a, before the second electric engine 8 follows in the axial direction opposite the first electric engine to complete the structure.

The options for wiring and for using the two electric engines 7, 8 as a base load engine on the one hand and as a boost engine on the other hand, and the possibility of designing the electric drive device 1 such that it can be power-shifted, do not substantially differ from the structures already described in the context of the previous FIG. 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An electric drive device for a vehicle axle, the electric drive device comprising:
    a first electric engine having a first rotor;
    a second electric engine having a second rotor;
    a transmission having a first input shaft arranged coaxially with the first rotor, a second input shaft arranged coaxially with the second rotor, and at least one output shaft arranged in parallel with the first input shaft and in parallel with the second input shaft, wherein the first input shaft is connected to the first rotor in a manner fixed against rotation, and wherein the second input shaft is connected or is connectable to the second rotor in a manner fixed against rotation;
    an axle drive, which has a differential gear permanently meshing with a first drive gearwheel connected to the at least one output shaft in a manner fixed against rotation;
    a first switchable spur gear pairing configured to couple the first input shaft with the differential gear in a torque-transmitting manner; and
    a second spur gear pairing configured to couple the second input shaft with the differential gear in a torque-transmitting manner,
    wherein, when viewed in an axial direction along the at least one output shaft, the first electric engine, the first spur gear pairing, the first drive gearwheel, the second spur gear pairing and the second electric engine are arranged one after the other in the specified order,
    wherein a third gearwheel is arranged coaxially with the second input shaft,
    wherein the second rotor and the second input shaft are couplable in a manner fixed against rotation to the third gearwheel by a coupling element to interrupt power flow in at least one direction of rotation,
    wherein the first drive gearwheel and the coupling element are arranged overlapping each other in the axial direction, and
    wherein the coupling element is a freewheel.

2. The electric drive device of claim 1, wherein the axle drive is arranged between the first electric engine and the second electric engine in relation to the axial direction.

3. The electric drive device of claim 1, wherein the second electric engine is an axial flux engine and has a length in the axial direction that is at least 25% shorter than that of a length of the first electric engine in the axial direction.

4. The electric drive device of claim 1, further comprising:
    a third spur gear pairing configured to couple the first input shaft with the differential gear in a torque-transmitting manner, wherein the first electric engine is couplable in a torque-transmitting manner with the differential gear via exactly two spur gear pairings, wherein the exactly two spur gear pairings are the first switchable spur gear pairing and the third spur gear pairing, and wherein the second electric engine is couplable in a torque-transmitting manner with the differential gear via exactly one spur gear pairing, wherein the exactly one spur gear pairing is the second spur gear pairing.

5. The electric drive device of claim 4, wherein the at least one output shaft comprises:
    at least one first output shaft; and at least one second output shaft,
    wherein the differential gear permanently meshes with a second drive gearwheel connected to the at least one second output shaft in a manner fixed against rotation,
    wherein the first spur gear pairing has a first gearwheel arranged coaxially with the first input shaft and a second gearwheel arranged coaxially with the first output shaft,
    wherein the second spur gear pairing includes the third gearwheel arranged coaxially with the second input shaft and a fourth gearwheel arranged coaxially with the first output shaft, and
    wherein the third spur gear pairing comprises the first gearwheel arranged coaxially with the first input shaft and a fifth gearwheel arranged coaxially with the second output shaft.

6. The electric drive device of claim 5, wherein
the first spur gear pairing has a first switch element arranged coaxially with the first output shaft,
the third spur gear pairing has a third switch element arranged coaxially with the second output shaft,
the first switch element and the third switch element are arranged overlapping in the axial direction, and
the first electric engine, the first spur gear pairing, the first switch element, the coupling element, the second spur gear pairing, and the second electric engine are arranged one after the other in the specified order in relation to the axial direction.

7. The electric drive device of claim 6, wherein the first and third switch elements are claw switch elements.

* * * * *